No. 897,818. PATENTED SEPT. 1, 1908.
W. S. CLARK.
CUTTER BAR FOR HARVESTERS.
APPLICATION FILED JAN. 2, 1908.
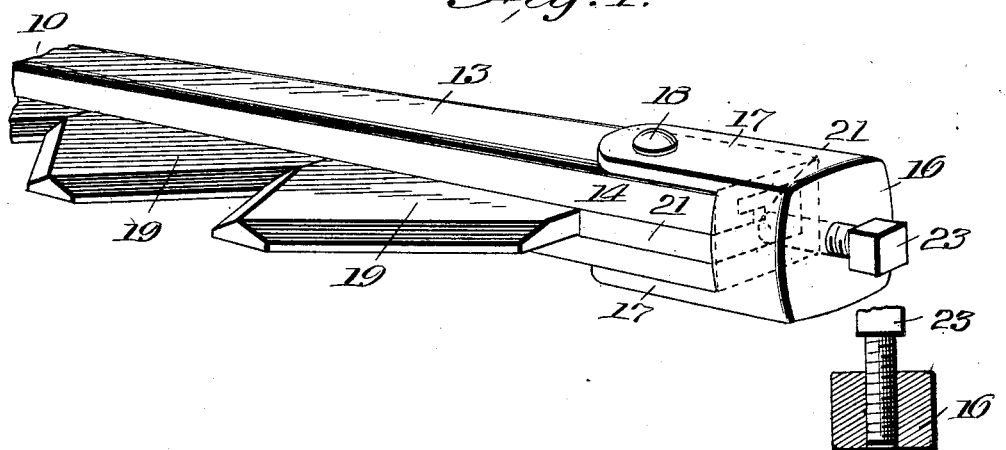
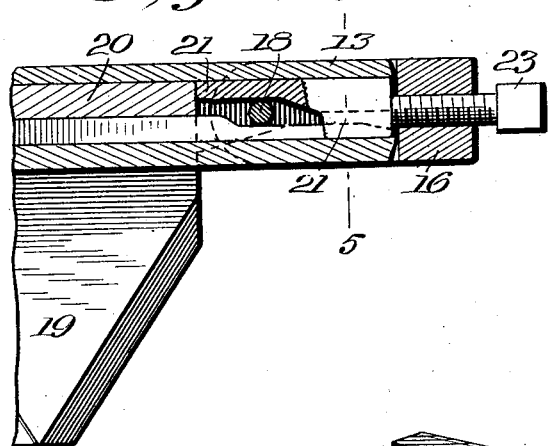
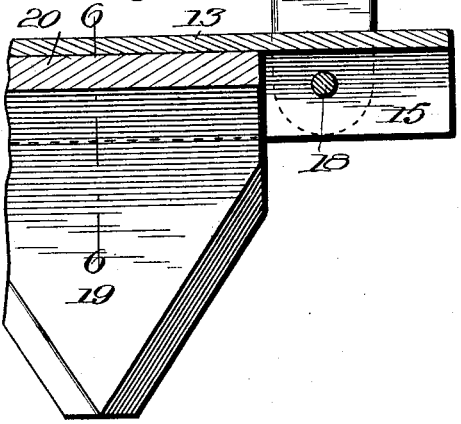
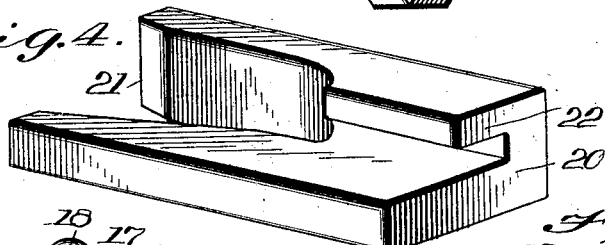
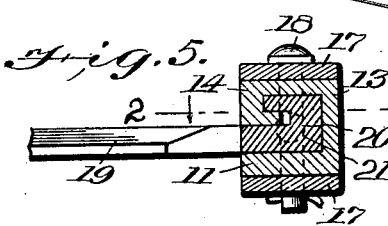
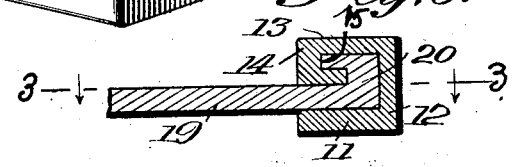
Witnesses
Inventor
WILLIAM S. CLARK
By Attorneys

UNITED STATES PATENT OFFICE.

WILLIAM S. CLARK, OF HARRISVILLE, WEST VIRGINIA, ASSIGNOR OF ONE-HALF TO WILLIAM R. MESERVIE, OF HARRISVILLE, WEST VIRGINIA.

CUTTER-BAR FOR HARVESTERS.

No. 897,818.     Specification of Letters Patent.     Patented Sept. 1, 1908.

Application filed January 2, 1908. Serial No. 408,998.

*To all whom it may concern:*

Be it known that I, WILLIAM S. CLARK, a citizen of the United States, and a resident of Harrisville, in the county of Ritchie and State of West Virginia, have invented certain new and useful Improvements in Cutter-Bars for Harvesters, of which the following is a specification.

My invention relates to improvements in cutter bars and cutter blades for harvesters in which the blades are made in sections which are readily removable for sharpening, or replacing when worn or broken, the object of my invention being to produce a cutter bar and appurtenances which shall be strong, simple and cheap and one in which no rivets are necessary.

My invention consists in certain novel features of construction, arrangement and combination of parts as will be hereinafter fully described and pointed out in the claims reference being had to the accompanying drawing in which Figure 1 is a perspective view of the head end of a cutter bar embodying my improvements. Fig. 2 is a horizontal sectional view of same, taken on line 2—2 of Fig. 5. Fig. 3 is a horizontal sectional view showing the pivoted cap at head end of cutter bar, taken on line 3—3 of Fig. 6. Fig. 4 is a perspective view of the clamping blocks. Fig. 5 is a vertical section on line 5—5 of Fig. 2. Fig. 6 is a vertical section on line 6—6 of Fig. 3.

In carrying out my invention I use a cutter bar 10, which is made a flat bar of steel folded over upon itself to form a bottom wall 11, a back wall 12, a top wall 13, and a short front wall 14, and a short horizontal wall 15, thus forming a longitudinal groove in the rear of wall 14; the outer end of said cutter bar of wall 14 is open, the opening being covered by a cap 16, which has the upper and lower ears 17, pivoted to the cutter bar by a pin or bolt 18, as indicated in Figs. 2 and 5; the folded formation of the cutter bar forms a longitudinal channel which is to receive the blades or knives 19; the channel at the inner end of the cutter bar is closed, and has the usual block for attachment to the pitman of the driving gear; the blades or knives are of the usual shape except that each blade is provided with an angular hook-shaped rear end 20, which is similar in shape to the channel of the cutter bar and is adapted to be slid longitudinally into the same; these blades or knives are slid into the cutter bar from the outer end, the cap 16, being swung back to the position shown in Fig. 3; when all of the blades have been slid into the cutter bar, a bifurcated block 21, having an angular hook 22 at its rear end is then slid into the channel of the cutter bar against the last blade and the cap then swung back to position shown in Figs. 1 and 2; a set screw 23 is threaded through the end of cap 16, and is adapted to bear against the end of the clamping block 21; by screwing the set screw 23 into the cap the end of the said set screw impinges against the clamping block and forces the same against the last blade and this in turn is forced against the next blade and so on forcing all the blades toward the inner end of the cutter bar; the set screw is driven inwardly until all the blades or knives are securely clamped in place and will be thus held while the cutter bar is in use.

It will thus be seen that when it is necessary to sharpen the blades each one can be easily removed and sharpened, which is much more desirable and convenient than where the blades have to be sharpened while in the cutter bar, as is usual in the old form of harvesters; if one or more of the blades or knives should become broken or worn, they can be quickly and easily removed as no rivets are used to be cut or removed. All that is necessary is a wrench to loosen and tighten the set screw.

I claim—

1. In a cutter bar for harvesters, the combination with a cutter bar having two longitudinal channels and a vertical channel connecting the same, of cutter blades having a vertical flange at one edge and a horizontal ledge projecting from the same, said vertical flange and ledge adapted to slide in the aforesaid vertical and longitudinal channels, and means for clamping said blades in said channels.

2. In a cutter bar for harvesters, the combination with a cutter bar having two longitudinal channels and a vertical channel connecting the same, of cutter blades having a vertical flange at one edge and a horizontal ledge projecting from the same, said vertical flange and ledge adapted to slide in the aforesaid vertical and longitudinal channels, and a clamping block at the outer end of the cutter bar for holding the blades in place.

3. In a cutter bar for harvesters, the combination with a cutter bar having a longitudinal angular channel, of cutter blades having overhanging ledges and adapted to slide in said channel, a cap pivotally secured to the outer end of the cutter bar and adapted to close the channel at one end, and locking means mounted in said cap adapted to clamp the blades in the cutter bar.

4. In a cutter bar for harvesters, the combination with a cutter bar having a closed inner end and angular longitudinal channel, of cutter blades having overhanging ledges and adapted to slide in said channel, a bifurcated clamping block adapted to fit in said channel at the outer end of the cutter bar, a cap pivotally secured to the outer end of the cutter bar and adapted to close the channel at said end, and means mounted in said cap adapted to engage the clamping block and lock the cutter blades in the cutter bar.

5. In a cutter bar for harvesters, the combination with a cutter bar having a longitudinal angular channel, of cutter blades having overhanging ledges and adapted to slide in said channel, a cap pivotally secured to the outer end of the cutter bar and adapted to close the channel at said end, and a set screw mounted in said cap and adapted to clamp the blades in the cutter bar.

6. In a cutter bar for harvesters, the combination with a cutter bar having a closed inner end, and an angular longitudinal channel, of cutter blades having overhanging ledges and adapted to slide in said channel, a bifurcated clamping block adapted to fit in said channel at the outer end of the cutter bar, a cap pivotally secured to the outer end of the cutter bar and adapted to close the channel at said end, and a set screw mounted in said cap and adapted to impinge the clamp block and lock the cutter blades in the cutter bar.

WILLIAM S. CLARK.

Witnesses:
B. F. FOSTER,
H. E. WASS.